(12) United States Patent
Hsu et al.

(10) Patent No.: US 11,256,058 B2
(45) Date of Patent: Feb. 22, 2022

(54) OPTICAL ELEMENT DRIVING MODULE

(71) Applicant: TDK TAIWAN CORP., Taoyuan (TW)

(72) Inventors: Shang-Yu Hsu, Taoyuan (TW);
Nai-Wen Hsu, Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 174 days.

(21) Appl. No.: 16/797,460

(22) Filed: Feb. 21, 2020

(65) Prior Publication Data

US 2020/0192052 A1    Jun. 18, 2020

Related U.S. Application Data (63) Continuation of application No. 16/433,387, filed on Jun. 6, 2019, now Pat. No. 10,606,022, which is a continuation of application No. 15/805,881, filed on Nov. 7, 2017, now Pat. No. 10,359,599.

(30) Foreign Application Priority Data

Jan. 12, 2017  (TW) .................................. 106100942

(51) Int. Cl.
*G02B 7/02*      (2021.01)
*G02B 7/08*      (2021.01)

(52) U.S. Cl.
CPC ............. *G02B 7/021* (2013.01); *G02B 7/026* (2013.01); *G02B 7/08* (2013.01)

(58) Field of Classification Search
CPC ........... G02B 7/021; G02B 7/08; G02B 7/026
See application file for complete search history.

(56) References Cited

U.S. PATENT DOCUMENTS

2015/0155768 A1*  6/2015  Hsu .................... H02K 41/0356
                                                        250/234

FOREIGN PATENT DOCUMENTS

| CN | 203761238 U | 8/2014 |
| CN | 205787314 U | 12/2016 |
| JP | 2008-111961 A | 5/2008 |

OTHER PUBLICATIONS

Taiwanese Office Action of corresponding TW Application No. 106100942 dated Oct. 3, 2017, 5 pages.

* cited by examiner

*Primary Examiner* — James C. Jones
(74) *Attorney, Agent, or Firm* — Muncy, Geissler, Olds & Lowe, P.C.

(57) ABSTRACT

An optical element driving module is provided, including a housing, a movable portion configured to support an optical element, a driving assembly, a positioning sensor, and a non-metallic substrate disposed on a side of the movable portion. The movable portion is movable relative to the housing, the driving assembly is configured to drive movement of the movable portion relative to the housing, and the positioning sensor is configured to detect the movement of the movable portion relative to the housing. Specifically, the non-metallic substrate forms a recess for receiving the positioning sensor, wherein a depth of the recess is greater than a height of the positioning sensor.

20 Claims, 10 Drawing Sheets

OPTICAL ELEMENT DRIVING MODULE

CROSS REFERENCE TO RELATED APPLICATIONS

This application is a continuation application of U.S. patent application Ser. No. 16/433,387, filed Jun. 6, 2019, which is a continuation application of U.S. patent application Ser. No. 15/805,881, filed Nov. 7, 2017, which claims the priority of Taiwan Patent Application No. 106100942, filed on Jan. 12, 2017, the disclosure of which is hereby incorporated by reference herein in its entirety.

BACKGROUND OF THE DISCLOSURE

Field of the Invention

The present invention relates to an optical element driving module, and more particularly to an electromagnetic driving module which converts electrical energy into mechanical energy and a lens driving device using the same.

Description of the Related Art

Some electronic devices are equipped with a driving module to drive an element to move a predetermined distance. For example, an electronic device having an image-capturing function usually includes a driving module to generate driving power. One or more optical lens units of the electronic device are driven by the driving power to move along a direction which is perpendicular to an optical axis, so as to facilitate image stabilization.

However, since the driving module includes a complex driving member, such as stepper motor, ultrasonic motor, piezoelectric actuators, etc. to generate the driving power and the driving power has to be transmitted by a number of transmission elements, it is not easy to assemble and the manufacturing cost is high. In addition, a conventional driving module is also large in size and has a high power consumption due to its complex construction.

Japan patent published number 2008-111961 discloses a lens driving module including a flexible printed circuit board connected to internal electrical elements and an external electric contact so as to supply electrical signal or power to the lens driving module. The conventional flexible printed circuit board is electrically connected to the internal electrical elements or traces by wielding. However, due to the poor strength of the flexible printed circuit board, it is easy to produce an open circuit after deformation of the flexible printed circuit board. In addition, since it is not easy to control the dimensions of the flexible printed circuit board the manufacturing process, the flexible printed circuit would not be connected to other elements in the assembling process.

BRIEF SUMMARY OF THE DISCLOSURE

Accordingly, one objective of the present disclosure is to provide an optical element driving module, which utilize new circuit arrangements, so as to improve assembling efficiency and production yield.

According to some embodiments of the disclosure, the optical element driving module includes a housing, a movable portion configured to support an optical element, a driving assembly, a positioning sensor, and a non-metallic substrate disposed on a side of the movable portion. The movable portion is movable relative to the housing, the driving assembly is configured to drive movement of the movable portion relative to the housing, and the positioning sensor is configured to detect the movement of the movable portion relative to the housing. Specifically, the non-metallic substrate forms a recess for receiving the positioning sensor, wherein a depth of the recess is greater than a height of the positioning sensor.

BRIEF DESCRIPTION OF THE DRAWINGS

For a more complete understanding of the embodiments, and the advantages thereof, reference is now made to the following descriptions taken in conjunction with the accompanying drawings.

DETAILED DESCRIPTION OF THE ILLUSTRATIVE EMBODIMENTS

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

It should be noted that the elements or devices in the drawings of the present disclosure may be present in any form or configuration known to those skilled in the art. In addition, the expression "a layer overlying another layer", "a layer is disposed above another layer", "a layer is disposed on another layer" and "a layer is disposed over another layer" may indicate not only that the layer directly contacts the other layer, but also that the layer does not directly contact the other layer, there being one or more intermediate layers disposed between the layer and the other layer.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean+/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 1:
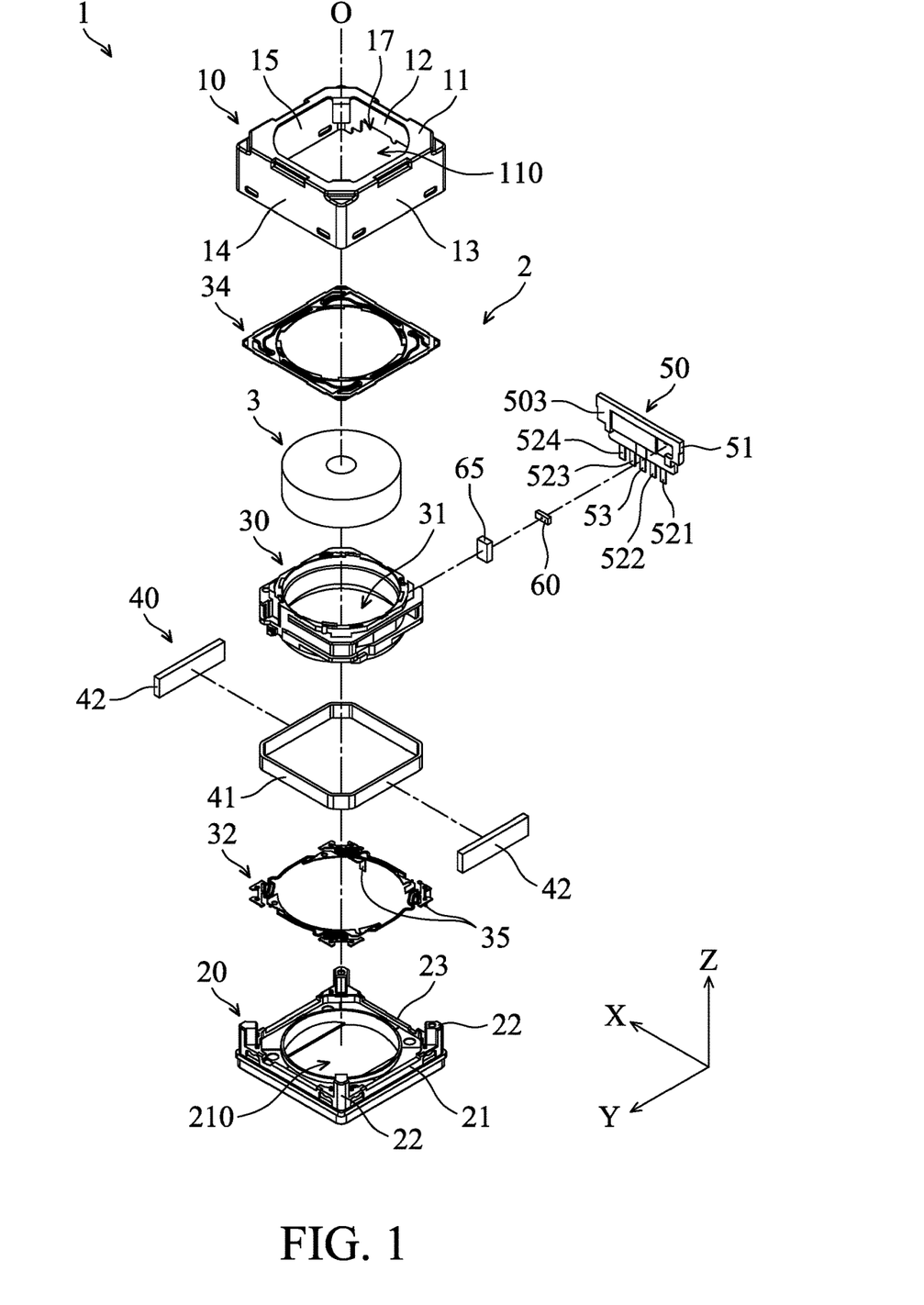
FIG. 1 shows an exploded view of a camera device, in accordance with some embodiments.

FIG. 1 shows an exploded view of a camera device 1. In some embodiments, the camera device 1 includes a lens driving module 2 and a lens assembly 3 (optical element). The lens driving module 2 is configured to support the lens assembly 3 and to control the movement of the lens assembly 3.

In accordance with some embodiments of the disclosure, the lens driving module 2 includes a housing 10, a base 20 (fixed portion), a movable portion 30, a lower spring sheet 32, a upper spring sheet 34, an electromagnetic driving assembly 40, a circuit board 50, a positioning sensor 60 and a base member 65 that are arranged along an optical axis O of the lens assembly 3. The lens driving module 2 has a polygonal shape (e.g. substantially rectangular shape) when viewed along the optical axis O of the lens assembly 3. The elements of the lens driving module 2 can be added to or omitted, and the invention should not be limited by the embodiment.

In some embodiments, the housing 10 includes an upper housing member 11 and a number of lateral housing members, such as lateral housing members 12, 13, 14 and 15. The upper housing member 11 has a rectangular shape, and an opening 110 which is aligned with the optical axis O is formed on the upper housing member 11. The lateral housing members 12, 13, 14 and 15 extend from the four edges of the upper housing member 11 toward the base 20 and are connected to the base 20. The lateral housing member 12 faces the lateral housing member 14, and the lateral housing member 13 faces the lateral housing member 15. In addition, a notch 17 is formed on the lower edge of the lateral housing member 12.

Still referring to FIG. 1, the base includes a main body 21 and a number of positioning pillar, such as four positioning pillars 22. The base 20 has a substantial rectangular shape and is penetrated by an opening 210 which is aligned with the optical axis O. The four positioning pillars 22 projected from four corners of the main body 21 toward the upper housing member 11. The housing 10 and the base 20 define a space for receiving other elements of the lens driving module 2.

The lower spring sheet 32 is positioned on the main body 21 of the base 20. The two conductive pins 35 are located at a side of the lateral housing member 12 and are connected to the lower spring sheet 32. The upper spring sheet 34 is positioned on the positioning pillars 22. The movable portion 30 is sandwiched between the lower spring sheet 32 and the upper spring sheet 34. The movable portion 30 is penetrated by a channel 31, and the lens assembly 3 is positioned in the channel 31.

The electromagnetic driving assembly 40 is configured to drive the movement of the movable portion 30 relative to the base 20. The electromagnetic driving assembly 40 includes a coil 41 and a number of magnets 42, such as two magnets 42. The coil 41 has a circular shape and surrounds the outer surface of the movable portion 30. The coil 41 allows an electric current to pass through. The two magnets 42 are disposed on the two lateral housing members, such as the lateral housing members 13 and 15 and face the coil 41. In some embodiments, the coil 41 is electrically connected to an external circuit via the lower spring sheet 32 and the conductive pin 35 and receives the electric current to produce an magnetic field to drive the movement of the movable portion 30 relative to the base 20.

The circuit board 50 is positioned between the lateral housing member 12 and the movable portion 30 and includes a plastic substrate 51 (non-metallic substrate), a number of 3-D circuits, such as four 3-D circuits 521, 522, 523 and 524, and a ground circuit 53. As show in FIG. 2, the four 3-D circuits 521, 522, 523 and 524 are sequentially arranged along the extending direction of the lateral housing member 12. The ground circuit 53 is positioned between the 3-D circuits 522 and 523. The two conductive pins 35 are positioned adjacent to two of the outermost 3-D circuits 521 and 524. As a whole, the plastic substrate 51 is positioned in a substantial center of the lateral housing member 12, and the ground circuit 53 is arranged at a middle position of the four 3-D circuits 521, 522, 523 and 524.

Figure 2:
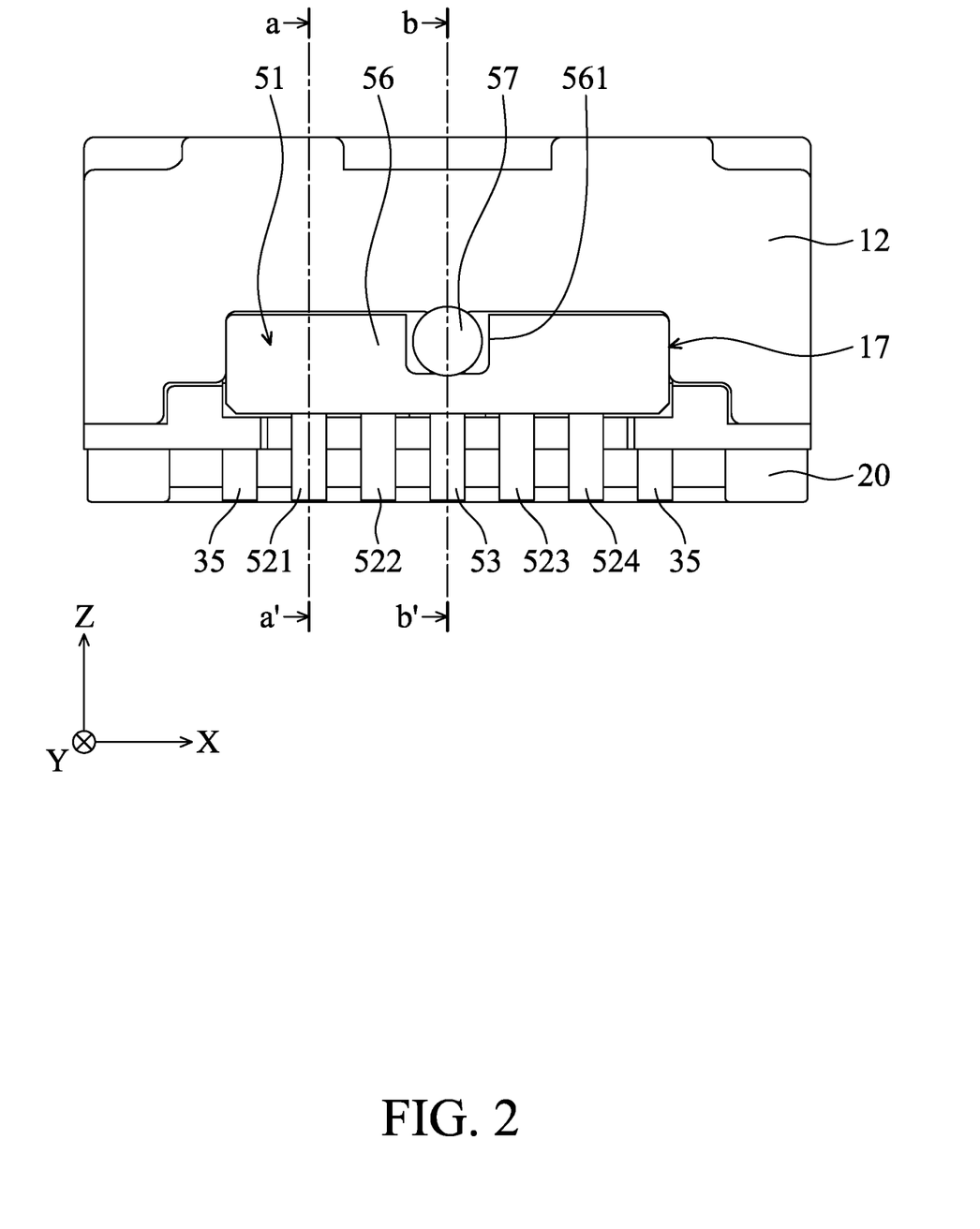
FIG. 2 shows a side view of the lens driving module, in accordance with some embodiments.
Figure 3A:
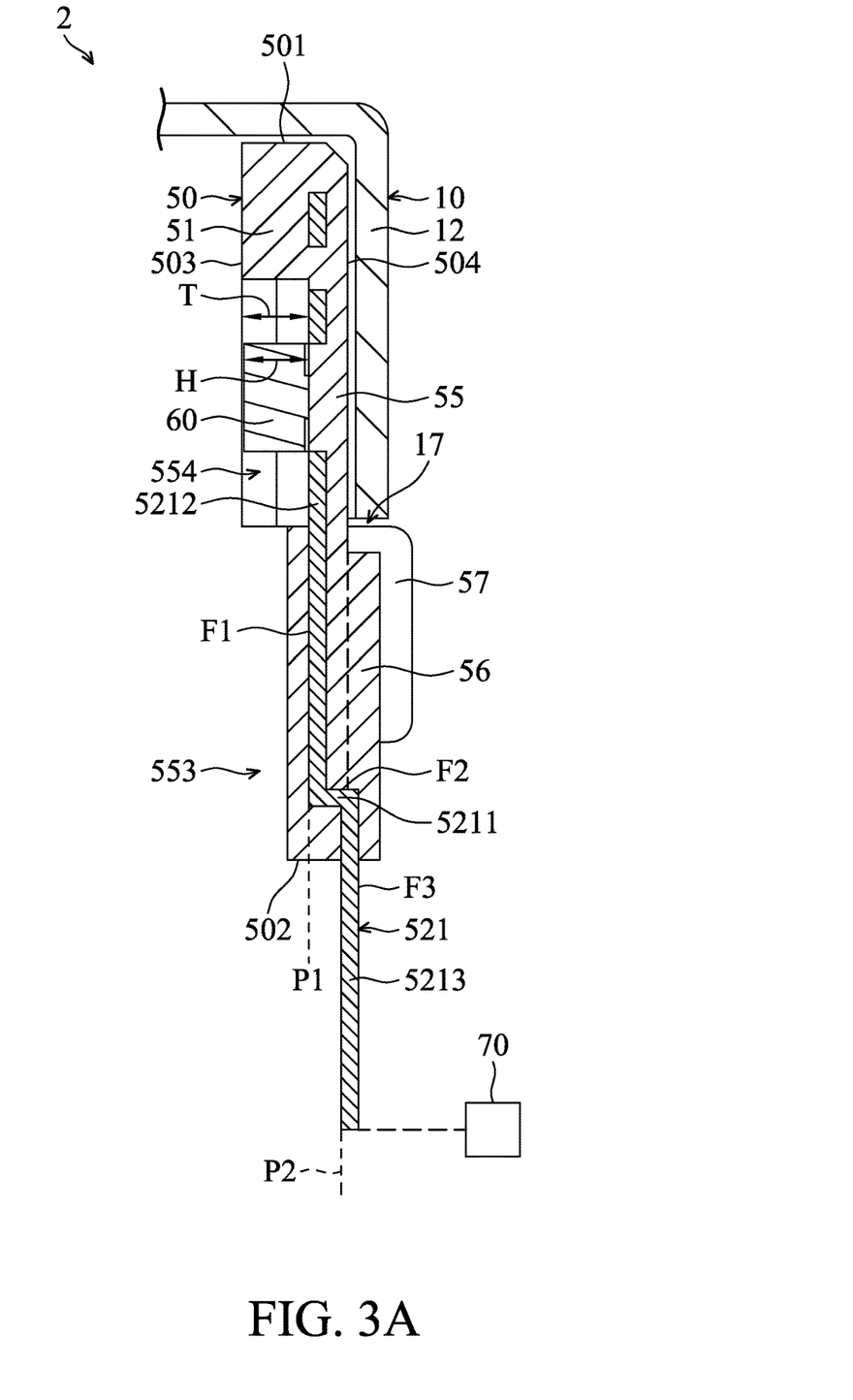
FIG. 3A shows a schematic cross-sectional view of the lens driving module taken along line a-a' of FIG. 2.

FIG. 3A shows a schematic cross-sectional view of the lens driving module 2 taken along line a-a' of FIG. 2. Referring FIG. 3A with reference to FIG. 2, in some embodiments, the plastic substrate 51 is a panel which is not tend to be bent and includes and inner panel 55 and an outer panel 56.

The inner panel 55 is positioned between the lateral housing member 12 and the movable portion 30 (FIG. 1). In some embodiments, the inner panel 55 extends from a lower edge 502 of the plastic substrate 51 to an upper edge 501, and a recess 554 is formed on an inner surface 503 of the inner panel 55 which is adjacent to the movable portion 30 (FIG. 1), and the positioning sensor 60 is positioned in the recess 554. The depth T of the recess 554 may be grater or equal to a height H of the positioning sensor 60. As a result, when the positioning sensor 60 is positioned the recess 554, the positioning sensor 60 is not higher than the inner surface the inner panel 55, and the width of the lens driving module 2 along a direction that is perpendicular to the optical axis O (FIG. 1) is decreased, accordingly. However, the disclosure should not be limited to the embodiments, the depth T of the recess 554 may be smaller than the height H of the positioning sensor 60, when the positioning sensor 60 is positioned the recess 554, the positioning sensor 60 is slightly higher than the inner surface of the inner panel 55.

In some embodiments, the inner panel 55 further has a depressing portion 553. The depressing portion 553 is immediately adjacent to the lower edge 502 of the plastic substrate 51, and a portion of the main body 21 (FIG. 1) which is adjacent to the lateral surface 23 is positioned in the depressing portion 553, so as to decrease the width of the lens driving module 2 along a direction that is perpendicular to the optical axis O (FIG. 1).

The outer panel 56 is connected to an outer surface 504 of the inner panel 55 and extends in a direction toward the upper edge 501 from a lower edge 502 of the plastic substrate 51, and distant from the upper edge 501. In some embodiments, the outer panel 56 has a shape corresponds to the shape of notch 17 on the lateral housing member 12. The outer panel 56 is positioned in the notch 17 and seal the notch 17. Therefore, the elements positioned within the housing 10 are not exposed to the outside. In some embodiments, as shown in FIG. 2, a depression 561 is formed on the upper edge of the outer panel 56. The functions of upper edge of the depression 561 are described in detail in the description in relate to FIG. 3B.

Referring back to FIG. 3A, the 3-D circuit 521 can be formed on the plastic substrate 51 by insert molding techniques. In some embodiments, the 3-D circuit 521 includes an inner connecting portion 5212 (first portion), a middle portion 5211 (second portion) and an outer connecting portion 5213 (third portion). The inner connecting portion 5212 is located on the plane P1, and the outer connecting portion 5213 is located on the plane P2, wherein the plane P1 and the plane P2 are different and parallel to the optical axis O (FIG. 1). The inner connecting portion 5212 and the outer connecting portion 5213 extend in a direction parallel to the optical axis O for a predetermined length and is connected to each other by the middle portion 5211.

As shown in FIG. 3A, the inner connecting portion 5212 has a first surface F1 facing the positioning sensor 60. The middle portion 5211 is electrically connected to the positioning sensor 60 via the inner connecting portion 5212 and has a second surface F2 perpendicular to the first surface F1. The outer connecting portion 5213 is electrically connected to the positioning sensor 60 via the inner connecting and middle portions 5212, 5211, and the outer connecting portion 5213 has a third surface F3 perpendicular to the second surface F2.

It should be noted that the inner connecting, middle, and outer connecting portions 5212, 5211, 5213 in this embodiment respectively have a plate-shaped structure. The first surface F1 is not parallel to a thickness direction of the inner connecting portion 5212, the second surface F2 is not parallel to a thickness direction of the middle portion 5211, and the third surface F3 is not parallel to a thickness direction of the outer connecting portion 5213.

In some embodiments, one end of the inner connecting portion 5212 is exposed in the recess 554 to electrically connected to the positioning sensor 60 which is positioned in the recess 554. In addition, a portion of the outer connecting portion 5213 extends outwardly from the lower edge 502 of the plastic substrate 51 for a predetermined length for facilitating the connection to the external circuit 70. As a result, the electrical signals or power from the external circuit 70 can be transmitted to the positioning sensor 60 via the 3-D circuit 521. The configurations and structural features of the 3-D circuits 522, 523, 524 are similar to that of the 3-D circuit 521 and not repeated again for brevity.

Figure 3B:
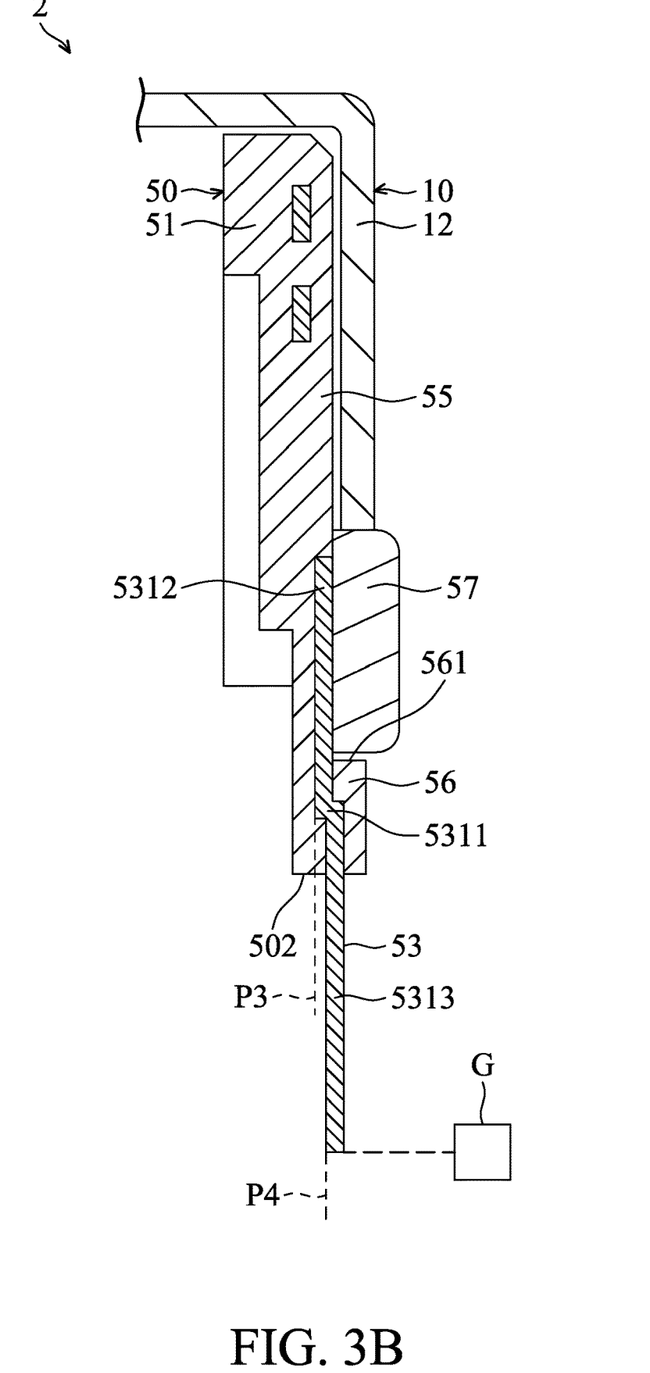
FIG. 3B shows a schematic cross-sectional view of the lens driving module taken along line b-b' of FIG. 2.

FIG. 3B shows a schematic cross-sectional view of the lens driving module 2 taken along line b-b' of FIG. 2. Referring to FIG. 3B with reference to FIG. 2. The ground circuit 53 can be formed on the plastic substrate 51 by insert molding techniques. In some embodiments, the ground circuit 53 includes an inner connecting portion 5312, a middle portion 5311 and an outer connecting portion 5313. The inner connecting portion 5312 is located on the plane P3, and the outer connecting portion 5313 is located on the plane P4, wherein the plane P3 and the plane P4 are different and parallel to the optical axis O (FIG. 1). The inner connecting portion 5312 and the outer connecting portion 5313 extend in a direction parallel to the optical axis O for a predetermined length and is connected to each other by middle portion 5311.

In some embodiments, one end of the inner connecting portion 5312 is exposed in the depression 561. In addition, a portion of the outer connecting portion 5313 extends outwardly from the lower edge 502 of the plastic substrate 51 for a predetermined length for facilitating the connection to the external ground line G. A conductive element 57 (such as conductive glue) is positioned in the depression 561 and is electrically connected to the lateral housing member 12 and the inner connecting portion 5312. Therefore, the housing 10 is grounded via the conductive element 57 and the ground circuit 53. However, it should be appreciated that the disclosure should not be limited to the embodiments, the housing 10 can be grounded by other method.

Figure 4:
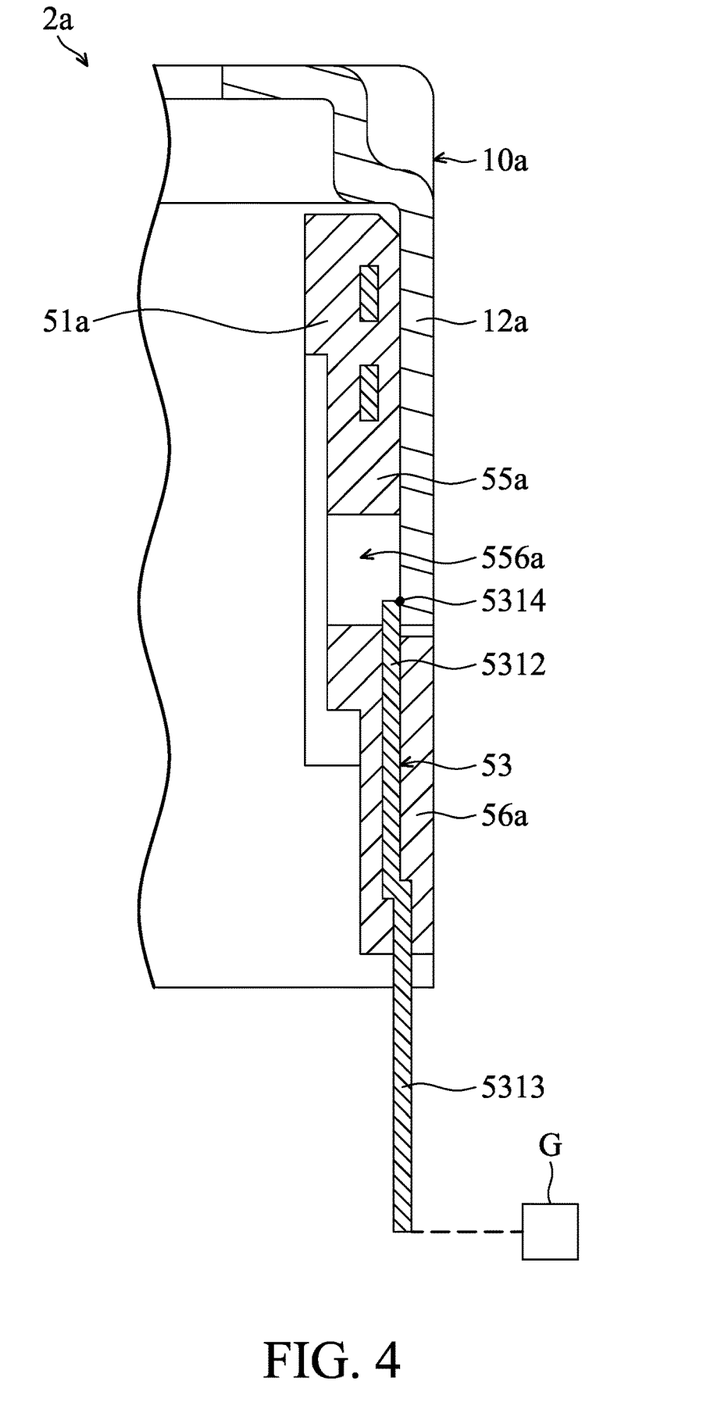
FIG. 4 shows a schematic cross-sectional view of partial elements of a lens driving module, in accordance with some embodiments.

For example, in a lens driving module 2a shown in FIG. 4, the inner panel 55a of the plastic substrate 51a is penetrated by a through hole 556a. One end of the inner connecting portion 5312 of the ground circuit 53 is exposed to the through hole 556a and is electrically connected the lateral housing member 12a. The outer connecting portion 5313 of the ground circuit 53 is electrically connected the external ground line G. A conductive element (such as conductive glue, not shown in figure) is optionally positioned in the through hole 556a for facilitating the electrical connection of the inner connecting portion 5312 to the lateral housing member 12a. Therefore, the housing 10a is grounded via the ground circuit 53. In this case, since the connecting point 5314 of the ground circuit 53 and the housing 10a are located within the lens driving module 2 and are not exposed to the outside of the lens driving module 2, a short circuit of the ground circuit 53 can be avoided, and the stability of the lens driving module 2 is improved.

During the operation of the lens driving module 2 mentioned in the above embodiments, a control module (not shown in figures) provides electric current to the coil 41 to control the movement of the movable portion 30 relative to the base 20 in the optical axis O. In addition, during the operation of the lens driving module 2, the positioning sensor 60 is used to detect changes in the magnetic field of the base member 65 on the movable portion 30 and to give feedback on the position of the movable portion 30 relative to the base 20 to the control module (not shown in the figures) according to the detected result, so as to establish a closed-loop control.

Figure 5:
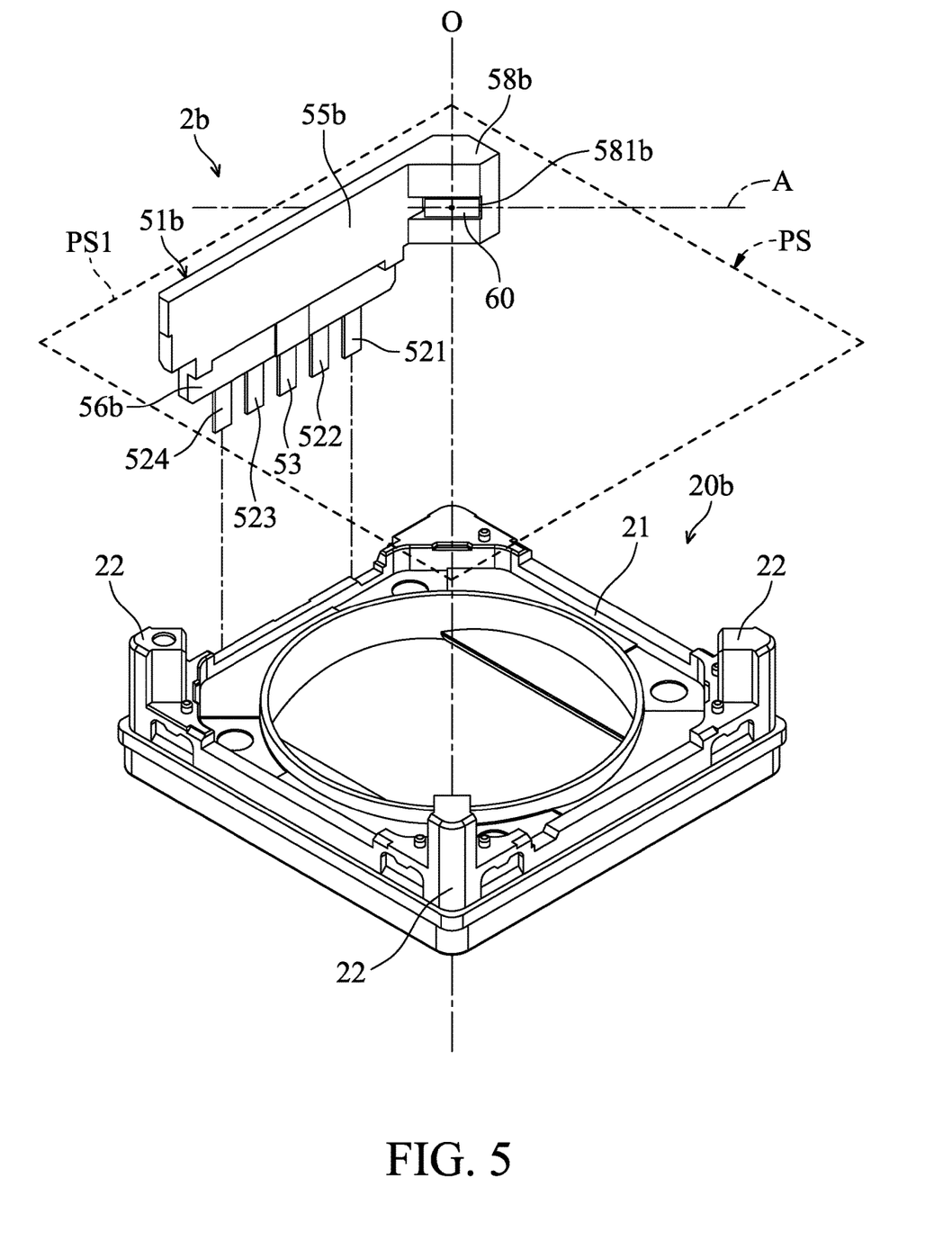
FIG. 5 shows an exploded view of partial elements of a lens driving module, in accordance with some embodiments.

FIG. 5 shows an exploded view of partial elements of a lens driving module 2b, in accordance with some embodiments of the disclosure. In the embodiments shown in FIG. 5, elements that are similar to those shown in FIGS. 1-3 are provided with the same reference numbers, and the features thereof are not reiterated in the interests of brevity.

Compared with the base 20 of the lens driving module 2, the base 20b of the lens driving module 2b has less positioning members 22. In addition, the plastic substrate 51b of the lens driving module 2b includes an inner panel 55b, an outer panel 56b and an extending panel 58b. The outer panel 56b is connected to an outer side of the inner panel 55b which is away from the base 20b. The extending panel 58b is positioned at one corner of the base 20b at which there is no positioning member 22 positioned and is connected to one side of the inner panel 55b.

A recess 581b is formed on an inner surface of the extending panel 58b which is adjacent to the base 20b, and the positioning sensor 60 is positioned in the recess 581b. The depth of the recess 581b is higher than or equal to the height of the positioning sensor 60. Alternatively, the depth of the recess 581b is slightly smaller than the height of the positioning sensor 60. The four 3-D circuit 521, 522, 523 and 524 can be formed on the plastic substrate 51b by insert molding techniques and are electrically connected the positioning sensor 60. In the embodiment, since at least a part of the positioning sensor 60 is positioned at the corner of the lens driving module 2b, the size of the lens driving module 2b can be decreased.

Referring to FIG. 5, the positioning sensor 60 defines a longitudinal axis A that intersects the plastic substrate 51b. Here, the positioning sensor 60 is angled with respect to a side PS1 of the polygonal shape PS (e.g. substantially rectangular shape) that is defined by the lens driving module 2b when viewed along the optical axis O of the lens assembly 3 as shown in FIG. 1. It should be noted that the positioning sensor 60 is neither perpendicular nor parallel to the side PS1 of the polygonal shape PS in FIG. 5.

Figure 6:
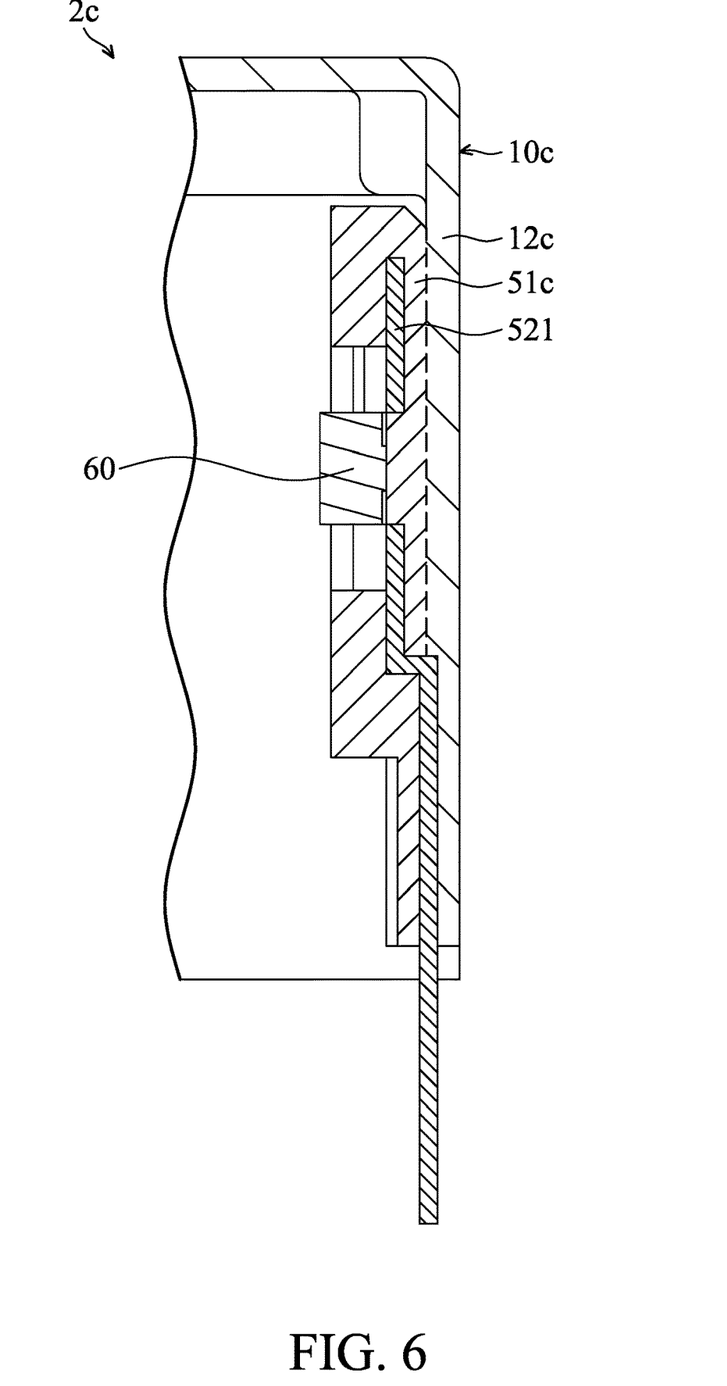
FIG. 6 shows a schematic cross-sectional view of partial elements of a lens driving module, in accordance with some embodiments.

FIG. 6 shows a schematic cross-sectional view of partial elements of a lens driving module 2c, in accordance with some embodiments. In the embodiments shown in FIG. 6, elements that are similar to those shown in FIGS. 1-3 are provided with the same reference numbers, and the features thereof are not reiterated in the interests of brevity.

In the embodiment, the plastic substrate 51c and the lateral housing member 12c of the housing 10c are formed integrally. For example, the housing 10c can be connected to the plastic substrate 51c by embedding process. As a result, the conventional follow-up processes such as bonding or assembling process can be omitted. In addition, the 3-D circuits 521, 522, 523 and 524 (only 3-D circuit 521 is shown in FIG. 6) are positioned at the inner side of the plastic substrate 51c by insert molding techniques and electrically connected to the positioning sensor 60 positioned on the plastic substrate 51c. In the embodiment, since the lens driving module 2c has fewer elements, the efficiency of the assembly process can be improved, and any decline in stability due to misalignment of the plastic substrate 51c can be prevented.

Figure 7:
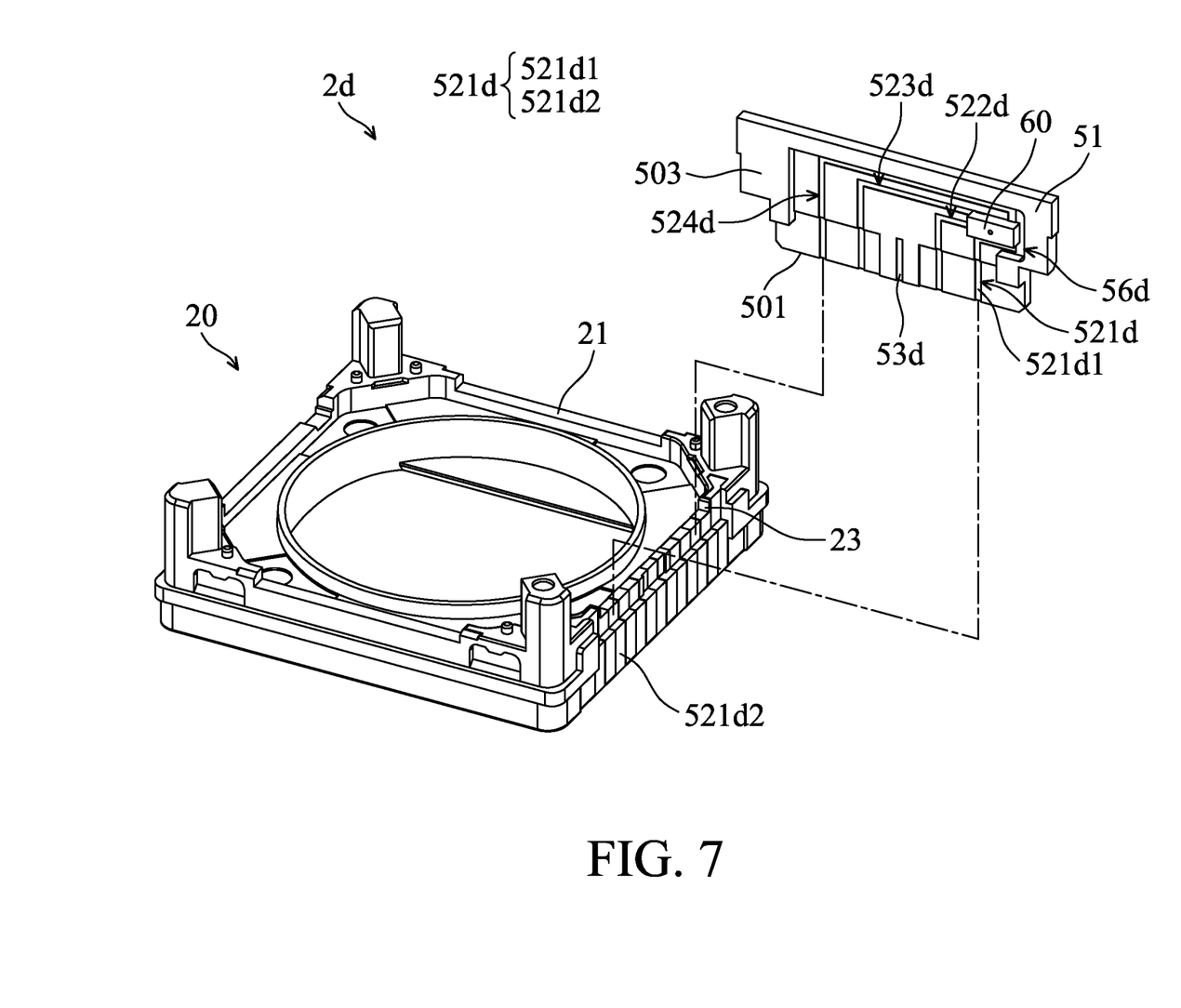
FIG. 7 shows an exploded view of partial elements of a lens driving module, in accordance with some embodiments.

FIG. 7 shows an exploded view of partial elements of a lens driving module 2d, in accordance with some embodiments. In the embodiments shown in FIG. 7, elements that are similar to those shown in FIGS. 1-3 are provided with the same reference numbers, and the features thereof are not reiterated in the interests of brevity.

Differences between the lens driving module 2d and the lens driving module 2 includes the 3-D circuit 521d, 522d, 523d, 524d and the ground circuit 53d being patterned on the surface of the base 20 and the surface of the plastic substrate 51 by Molded Interconnect Device (MID) techniques. In addition, each of the 3-D circuits 521d, 522d, 523d, 524d and the ground circuit 53d includes an upper trace and the lower trace, wherein the upper trace is formed on the plastic substrate 51, and the lower trace is formed on the base 20.

Figure 8:
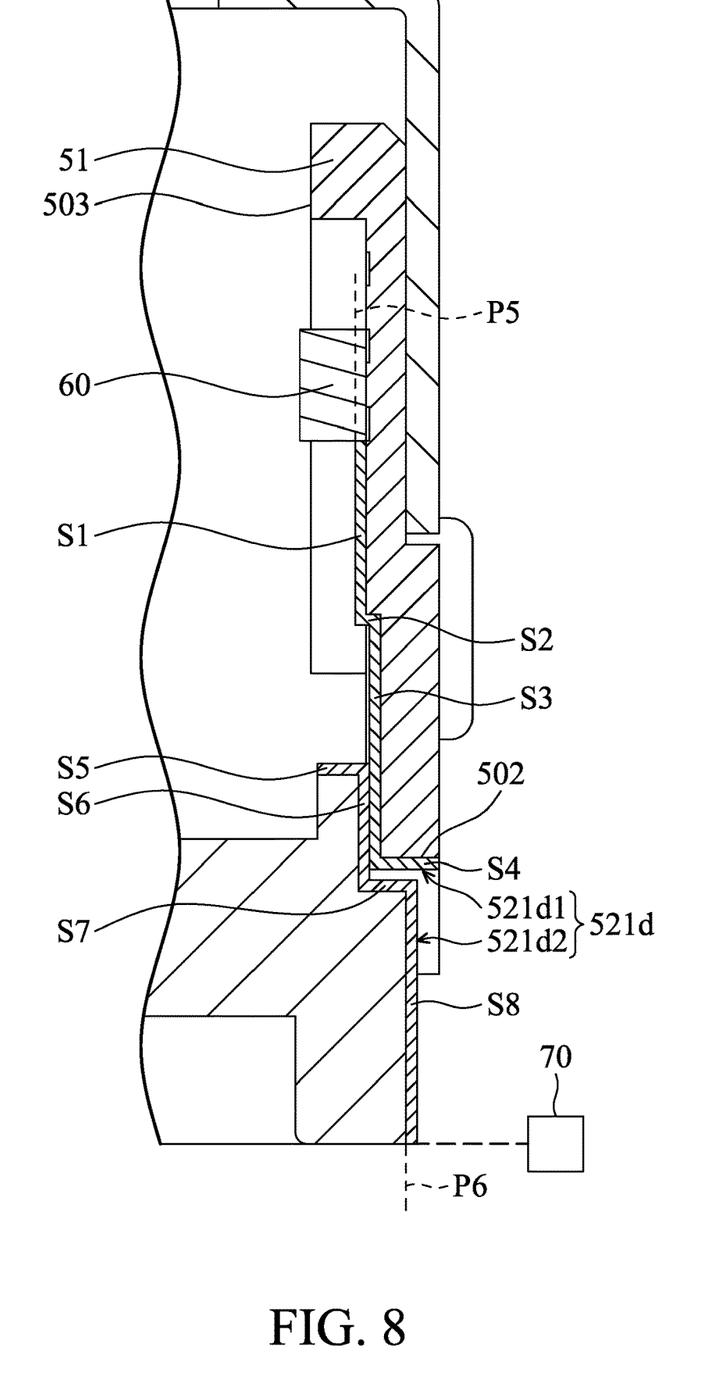
FIG. 8 shows a schematic cross-sectional view of partial elements of a lens driving module, in accordance with some embodiments.

For example, as shown in FIG. 8, the 3-D circuit 521d includes the upper trace 521d1 and the lower trace 521d2. The upper trace 521d1 includes two vertical sub-segments S1 and S3 and two horizontal sub-segments S2 and S4. The vertical sub-segment S1, the horizontal sub-segment S2, the vertical sub-segment S3 and the horizontal sub-segment S4 are sequentially connected to each other, wherein the vertical sub-segments S1 and S3 and the horizontal sub-segment S2 are formed on the inner surface 50 of the plastic substrate 51. The horizontal sub-segment S4 is formed on the lower edge 502 of the plastic substrate 51.

The lower trace 521d2 includes two horizontal sub-segments S5 and S7 and two vertical sub-segments S6 and S8. The horizontal sub-segment S5, the vertical sub-segment S6, the horizontal sub-segment S7, and the vertical sub-segment S8 are sequentially connected to each other and formed on the lateral surface 23 of the base 20.

In assembly, the vertical sub-segment S3 is in contact with the vertical sub-segment S6, and the horizontal sub-segment S4 is in contact with the horizontal sub-segment S7. In addition, the vertical sub-segment S1 is electrically connected to the positioning sensor 60, and the vertical sub-segment S8 is electrically connected to the external circuit 70. Therefore, electrical signals and power from the external circuit 70 can be transmitted to the positioning sensor 60 via the 3-D circuit 521d. The configurations and structural features of the 3-D circuits 522d, 523d, 524d are similar to that of the 3-D circuit 521d and not repeated again for brevity.

In the embodiment, the vertical sub-segment S1 electrically connected to the positioning sensor 60 is referred to as the inner connecting portion of the 3-D circuit 521d, and the vertical sub-segment S8 electrically connected the external circuit 70 is referred to as the outer connecting portion of the 3-D circuit 521d. The inner connecting portion S1 is located at the plane P5, and the outer connecting portion S8 is located at the plane P6, wherein the plane P5 and the plane P6 are different and parallel to the optical axis O (FIG. 1).

In the embodiment, since there are fewer elements of the lens driving module 2d, the efficiency of the assembly process can be improved, and any decline in stability due to misalignment of the plastic substrate 51d can be prevented. In addition, since the 3-D circuit 521d, 522d, 523d, 524d and the ground circuit 53d are directly formed on the surface of the plastic substrate 51, the thickness of the plastic substrate 51 is decreased.

Figure 9:
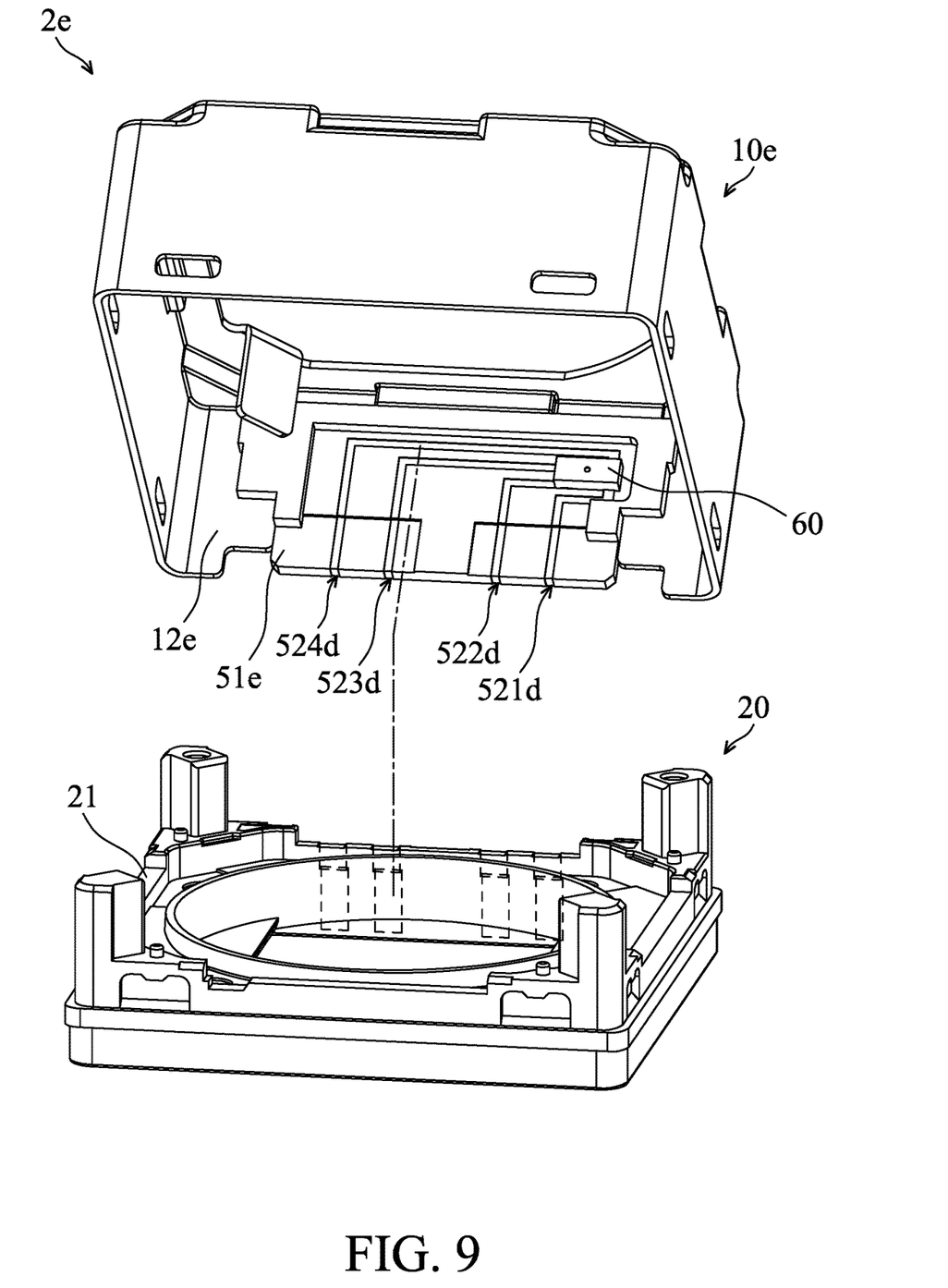
FIG. 9 shows an exploded view of partial elements of a lens driving module, in accordance with some embodiments.

FIG. 9 shows a schematic cross-sectional view of partial elements of a lens driving module 2e, in accordance with some embodiments. In the embodiments shown in FIG. 9, elements that are similar to those shown in FIG. 8 are provided with the same reference numbers, and the features thereof are not reiterated in the interests of brevity.

Differences between the lens driving module 2e and the lens driving module 2d includes the plastic substrate 51e and the lateral housing member 12e of the housing 10e being formed integrally. For example, the housing 10e can be connected to the plastic substrate 51e by embedding process. As a result, the follow-up processes such as bonding or assembling process can be omitted. In addition, the 3-D circuits 521d, 522d, 523d and 524d are patterned on the surface of the plastic substrate 51c by MID techniques and electrically connected to the positioning sensor 60 positioned on the plastic substrate 51e. In the embodiment, since there are fewer elements in the lens driving module 2e, the efficiency of the assembly process can be improved, and any decline in stability due to misalignment of the plastic substrate 51e can be prevented.

Embodiments of the disclosure employ one or more 3-D circuits to transmit electric signals or power for the operation of lens driving module. Since the structural strength of the 3-D circuits are superior to that of the conventional flexible circuit board, the lens driving module can be assembled accurately and efficiently. In addition, with the 3-D circuits which extend in different planes, the lens driving module has smaller size and can be utilized in a compact device.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical element driving module, comprising:
a fixed portion;

a movable portion, configured to support an optical element, wherein the movable portion is movable relative to the fixed portion;

a driving assembly, configured to drive movement of the movable portion relative to the fixed portion; and a positioning sensor, configured to detect the movement of the movable portion relative to the fixed portion, wherein the optical element driving module defines a polygonal shape when viewed along an optical axis of the optical element, and at least a part of the positioning sensor is positioned at a corner of the optical element driving module.

2. The optical element driving module as claimed in claim 1, further comprising a substrate disposed on a side of the movable portion, wherein the substrate forms a recess receiving the positioning sensor.

3. The optical element driving module as claimed in claim 2, wherein the recess does not penetrate the substrate, and a depth of the recess is greater than a height of the positioning sensor.

4. The optical element driving module as claimed in claim 2, wherein the positioning sensor defines a longitudinal axis that intersects the substrate.

5. The optical element driving module as claimed in claim 1, wherein the positioning sensor is angled with respect to a side of the polygonal shape when viewed along the optical axis of the optical element.

6. The optical element driving module as claimed in claim 1, wherein the positioning sensor is neither perpendicular nor parallel to a side of the polygonal shape.

7. The optical element driving module as claimed in claim 6, further comprising a substrate and a plurality of circuits disposed on the substrate, wherein the circuits are electrically connected to the positioning sensor and arranged along the side of the polygonal shape.

8. The optical element driving module as claimed in claim 1, further comprising a substrate disposed on a side of the movable portion and a circuit electrically connected to the positioning sensor, wherein the circuit comprises an inner connecting portion embedded in the substrate and an outer connecting portion protruding from the substrate, wherein the inner and outer connecting portions respectively have a plate-shaped structure and are parallel to each other.

9. The optical element driving module as claimed in claim 1, further comprising a substrate disposed on a side of the movable portion and a circuit disposed on the substrate, wherein the substrate forms a recess receiving the positioning sensor, and the circuit comprises:

a first portion, electrically connected to the positioning sensor and having a first surface facing the positioning sensor; and a second portion, electrically connected to the positioning sensor via the first portion and having a second surface not parallel to the first surface.

10. The optical element driving module as claimed in claim 9, wherein the circuit further comprises a third portion electrically connected to the positioning sensor via the first and second portions, and the third portion has a third surface not parallel to the second surface.

11. The optical element driving module as claimed in claim 10, wherein the first and third surfaces are located at different planes.

12. The optical element driving module as claimed in claim 11, further comprising a resilient member that electrically connects the driving assembly to the circuit.

13. The optical element driving module as claimed in claim 12, further comprising a housing connected to the fixed portion, wherein the housing has an upper housing member and at least a lateral housing member extending from the upper housing member along the optical axis of the optical element, and the lateral housing member and the circuit at least partially overlap when viewed along the optical axis.

14. The optical element driving module as claimed in claim 13, wherein the first, second, and third portions respectively have a plate-shaped structure, the first surface is not parallel to a thickness direction of the first portion, the second surface is not parallel to a thickness direction of the second portion, and the third surface is not parallel to a thickness direction of the third portion.

15. The optical element driving module as claimed in claim 13, wherein the circuit is positioned at a substantial center of the lateral housing member.

16. The optical element driving module as claimed in claim 9, wherein the first portion is patterned on the substrate by Molded Interconnect Device techniques.

17. The optical element driving module as claimed in claim 9, wherein the substrate and the housing are formed integrally.

18. The optical element driving module as claimed in claim 9, further comprising a housing and a ground circuit electrically connected to the housing, wherein the housing is connected to the fixed portion, and the ground circuit is positioned on the substrate, wherein a connecting point of the ground circuit and the housing is located within the optical element driving module and are not exposed to outside.

19. The optical element driving module as claimed in claim 9, wherein the substrate comprises plastic.

20. The optical element driving module as claimed in claim 1, wherein the optical element driving module has a substantially rectangular shape when viewed along the optical axis of the optical element.

* * * * *